United States Patent [19]
Kurita et al.

[11] Patent Number: 5,901,015
[45] Date of Patent: May 4, 1999

[54] MAGNETIC HEAD APPARATUS HAVING A REDUCED THICKNESS

[75] Inventors: Kazuhito Kurita; Toshihiro Kusunoki; Yasuhiro Habara, all of Tokyo; Takashi Ishizawa, Yamagata; Hideyuki Ikeda, Yamagata; Naoto Inoue, Yamagata, all of Japan

[73] Assignees: Sony Corporation; Mitsumi Electric Co., Ltd., both of Toyko, Japan

[21] Appl. No.: 08/826,470

[22] Filed: Mar. 27, 1997

[51] Int. Cl.⁶ ....................................................... G11B 5/48
[52] U.S. Cl. .............................................. 360/104; 369/13
[58] Field of Search .................................... 360/104, 113; 369/13

[56] References Cited

U.S. PATENT DOCUMENTS 5,657,300  8/1997  Takahashi et al. ......................... 369/13
5,663,937  9/1997  Takahashi et al. .................. 360/114 X

*Primary Examiner*—John H. Wolff
*Attorney, Agent, or Firm*—Ladas & Parry

[57] ABSTRACT

A magnetic head apparatus has a reduced thickness by preventing a jumping action of a magnetic head that can occur in a head-up state. A leaf spring has a first end and a second end opposite to the first end, and the leaf spring supporting the magnetic head at the first end, the leaf spring having a surface facing the magnetic medium. A mount member holds the leaf spring, the leaf spring being mounted to the mount member at the second end. A supporting portion extends from the mount member, and engages the surface of the leaf spring at a position between the magnetic head and the mount member.

10 Claims, 13 Drawing Sheets

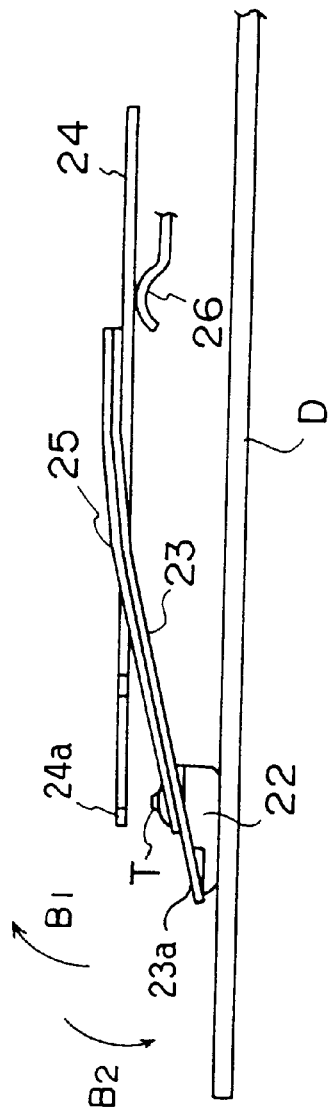
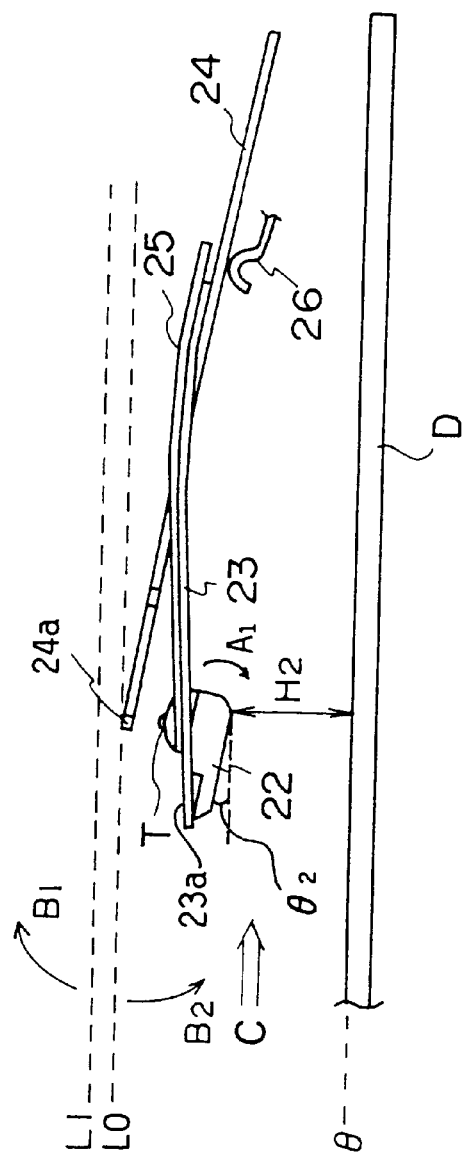

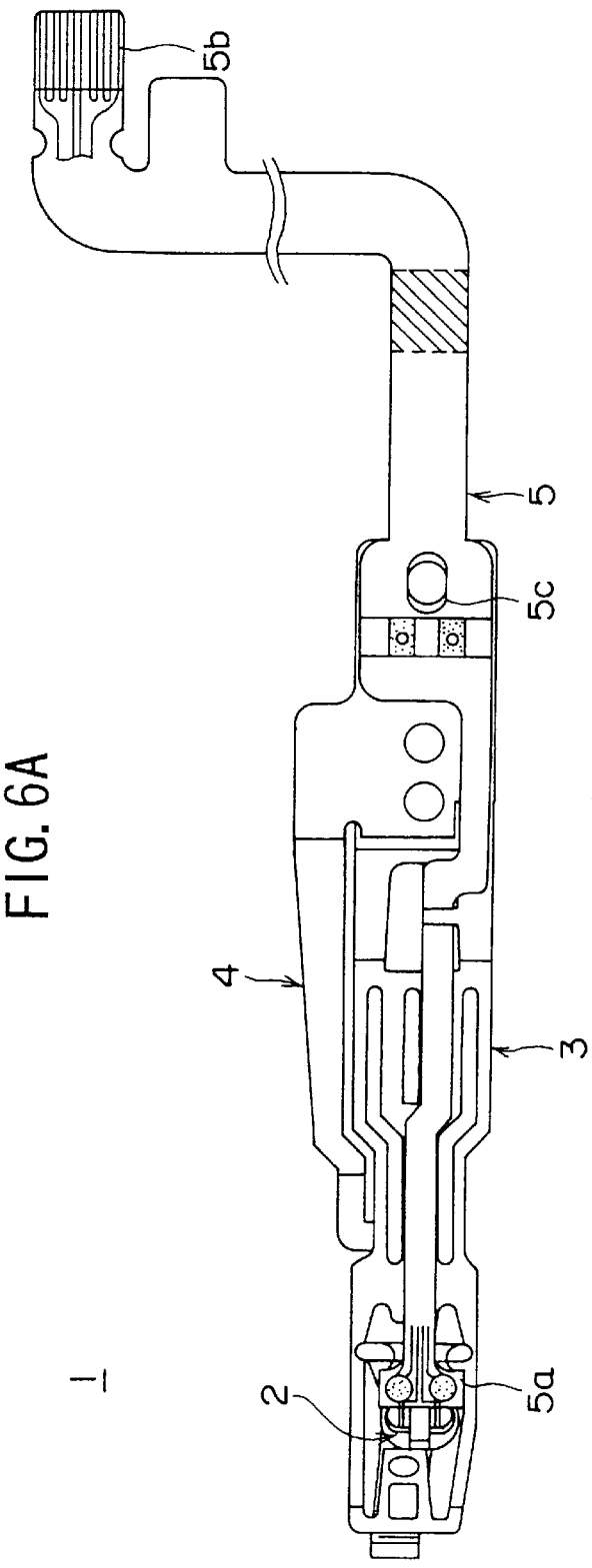
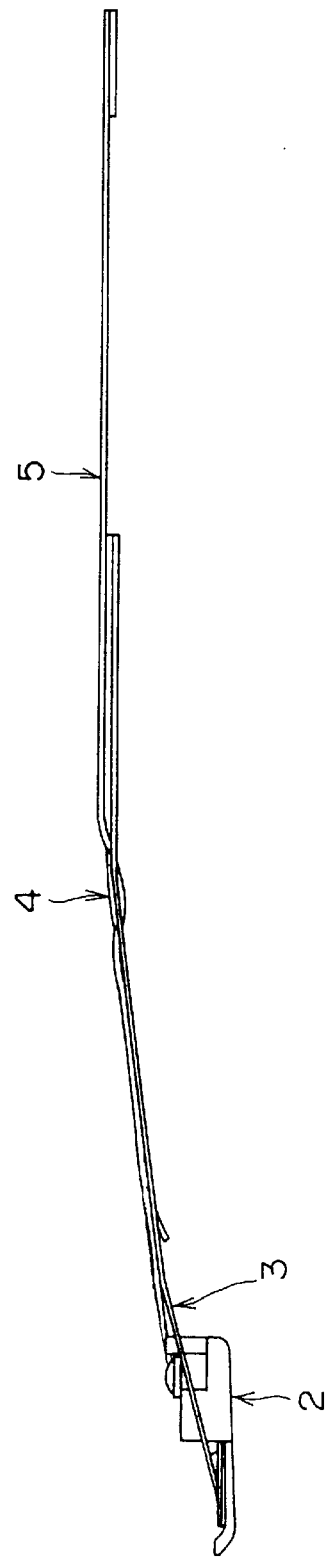
FIG. 6A
FIG. 6B

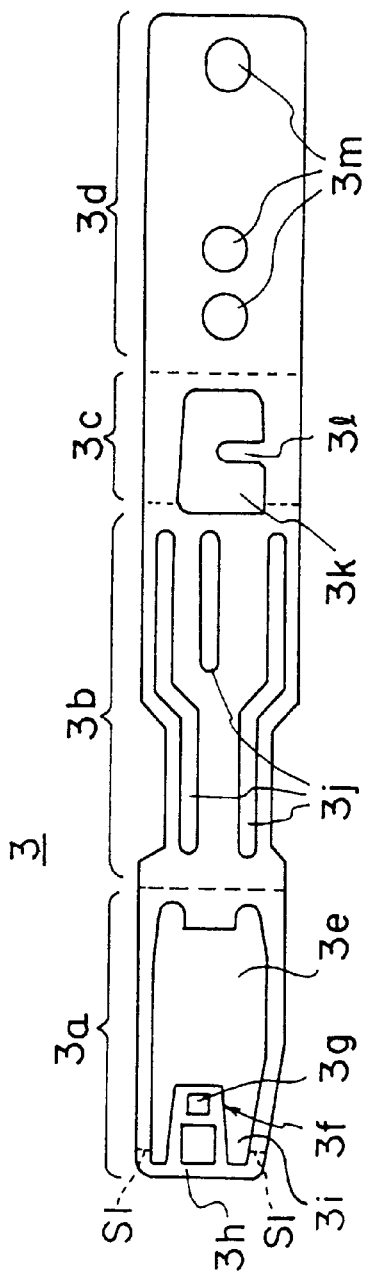
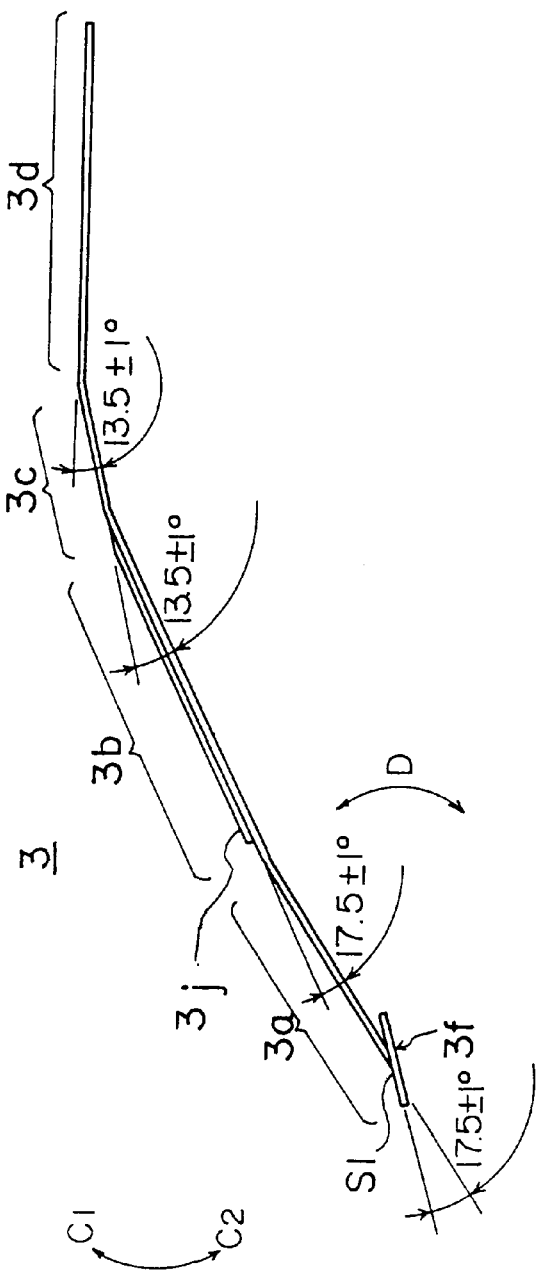
FIG. 8A
FIG. 8B

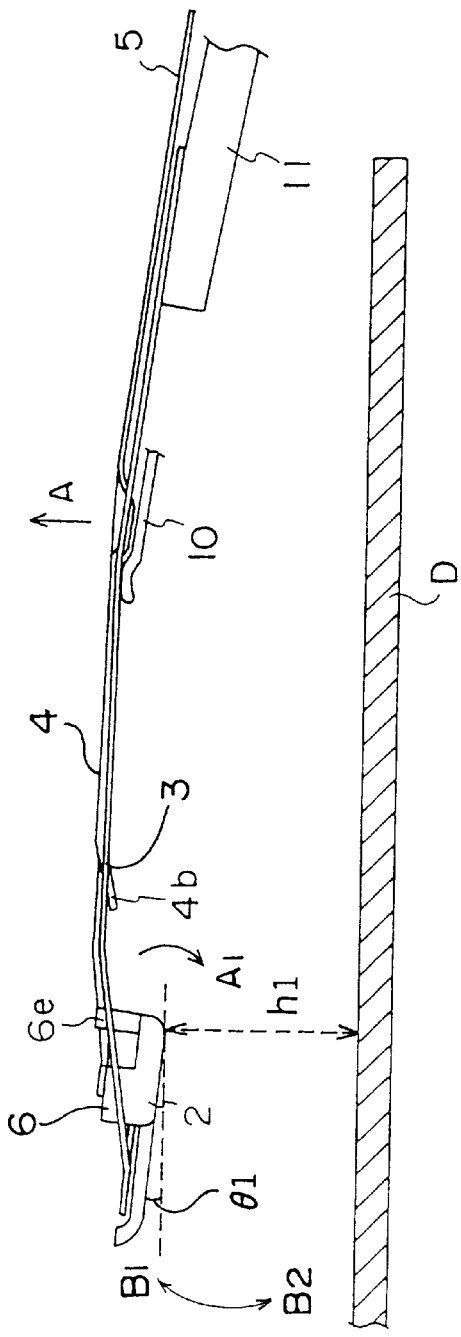
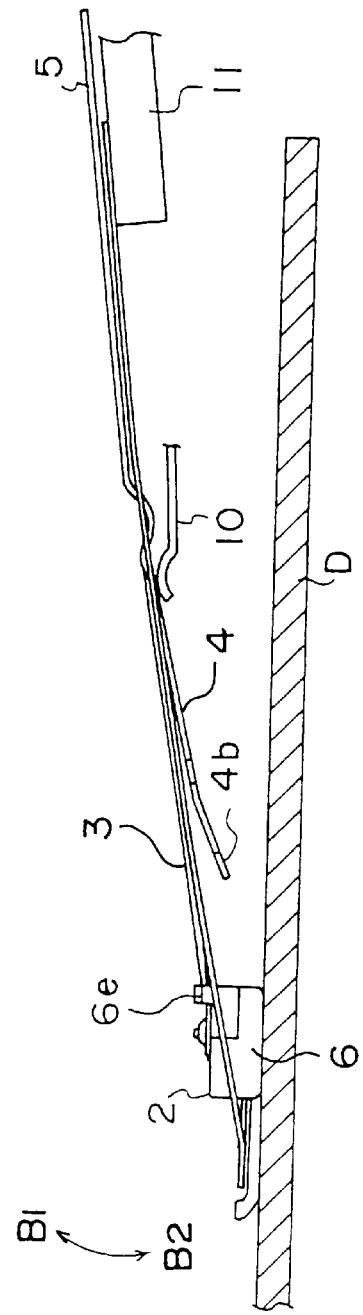

MAGNETIC HEAD APPARATUS HAVING A REDUCED THICKNESS

BACKGROUND OF THE INVENTION

1. Field of the Invention

The present invention generally relates to a magnetic head apparatus and, more particularly, to a magnetic head apparatus having a magnetic head which is supported by a support arm and contacts a recording medium.

2. Description of the Related Art

A magneto-optical disc apparatus has become popular as a disc apparatus which is capable of performing both recording and reproducing operations. The magneto-optical disc performs a high-density recording of information by using a laser beam and a disc provided with a magnetic thin-film thereon.

The magneto-optical disc apparatus projects a high-intensity laser beam to a surface of a magneto-optical disc (hereinafter referred to as a disc), when a recording operation is performed, so as to raise the temperature of the magnetic thin-film beyond a curie point or a temperature compensation point. A vertical magnetic field is applied from the opposite surface of the disc to reverse the direction of magnetization of the magnetic thin-film so as to record binary information on the disc. When a reproducing operation is performed, a laser beam, which does not affect the direction of magnetization of the magnetic thin-film, is projected on the disc so as to detect a rotational direction of a reflected laser beam from the disc. That is, the recorded binary information is reproduced by utilizing changes in the rotational direction of the reflected laser beam according to the direction of magnetization of the magnetic thin-film.

Such a magneto-optical disc apparatus is required to be a small size with a minimum thickness.

FIGS. 1A and 1B show a conventional magnetic head apparatus 21 provided in a magneto-optical disc apparatus. FIG. 1A is a plan view of the magnetic head apparatus 21, and FIG. 1B is a side view of the magnetic head apparatus 21.

The conventional magnetic head apparatus 21 comprises a magnetic head 22 which provides a recording magnetic field to a disc, a support arm 23 supporting the magnetic head 22, an operational unit 24 moving the magnetic head 22 up and down and a flexible print wiring board 25 electrically connecting the magnetic head 22 to an external device.

The magnetic head 22 includes a slider sliding on a surface of the disc. An E-shaped core and a coil are provided inside the slider. The coil is wound on a coil bobbin which is mounted on the core.

The support arm 23 is formed of a leaf spring material. A support portion 23a is formed on an extreme end of the support arm 23 to support the magnetic head 22. The opposite end of the support arm 23 is mounted to the operational unit 24 by welding and the like so that the magnetic head 22 is in contact with the disc.

The operational unit 24 is a rigid member to which the support arm 23 is mounted on an end portion thereof. The operational unit 24 is fixed, by means of screws, to a magnetic head apparatus mounting unit (not shown in the figures) which is movable in directions indicated by arrows A in FIG. 1B. A limiting portion 24a is integrally formed with the operational unit 24 at the end portion thereof so as to limit movement of the magnetic head 22 in a direction (indicated by an arrow $B_1$ in FIG. 1B) opposite to the direction toward the disc.

The limiting portion 24a extends to a position where the magnetic head 22 is mounted. The limiting portion 24a contacts an upper surface of the magnetic head 22 so as to limit the moving position of the magnetic head 22 when a shock is applied to the magnetic head apparatus so that the magnetic head 22 is prevented from moving upwardly (in the direction indicated by the arrow $B_1$) beyond the limiting portion 24a.

FIGS. 2A and 2B are views for explaining an operation of the conventional magnetic head apparatus 21. FIG. 2A shows a head-down state where the magnetic head 22 contacts a protective film of the disc. FIG. 2B shows a head-up state where the magnetic head 22 is lifted for loading or unloading the disc.

In the head-down state, the operational unit 24 is moved in a direction indicated by an arrow $B_2$ of FIG. 2A by an operational lever 26 being moved downwardly. Thus, magnetic head 22 is pressed against the disc D by an elastic deformation force of the support arm 23.

In the head-up state, the operational lever 26 is moved upwardly in a direction indicated by an arrow B1 of FIG. 2B so that the magnetic head 22 is spaced away from the disc D. In the head-up state, since the support arm 23 is in a neutral position where the support arm 23 is not elastically deformed, the magnetic head 22 may swing up and down due to shocks applied to the magnetic head apparatus 21. In order to reduce the thickness of the entire apparatus provided with the magnetic head apparatus 21, a space above the magnetic head apparatus 21 must be minimized.

Accordingly, the magnetic head 22 contacts the limiting portion 24a, which is provided in a position where the upward movement of the magnetic head 22 is limited, so that the magnetic head 22 does not move upwardly beyond a predetermined height when it swings. That is, the limiting portion 24a limits a jumping action of the magnetic head 22.

In the apparatus provided with the conventional magnetic head apparatus 21, other component parts are provided above a height $L_1$ shown in FIG. 2B. The height $L_1$ is determined by adding a distance, which considers a terminal T protruding upwardly from the limiting portion 24a, to a height $L_0$ which is a distance from the surface of the disc D to the uppermost end of the limit portion 24a. The terminal T is provided for electrically connecting the magnetic head 22 to the flexible print wiring board 25.

As mentioned above, in the conventional magnetic head apparatus, the limit portion 24a is provided to the operational unit 24, and the limit portion 24a contacts the upper surface of the magnetic head 22 so as to limit the upward jumping movement of the magnetic head 22 beyond the operational unit 24. Thus, the operational unit 24 extends to a position above the magnetic head 22, and the height (thickness) of the magnetic head apparatus 21 is defined by the limit portion 24a of the operational unit 24. Accordingly, the presence of the limit portion 24a is an obstacle to reduction of the height of the magnetic head apparatus 21.

Additionally, in the magnetic head apparatus 21, since the magnetic head 22 is supported at a single point on the end portion of the support arm 23, the end portion of the support arm 23 is elastically bent due to the weight of the magnetic head 22. The magnetic head 22 is inclined in a direction indicated by an arrow $A_1$ in FIG. 2B so that the rear end of the magnetic head is lowered than the front end of the magnetic head 22. Thus, a leading end of the disc D being inserted in a direction indicated by an arrow C does not engage with the front end of the magnetic head 22, resulting in a smooth insertion of the disc D. The position of the rear end of the magnetic head 22 is determined by the flexible print wiring board 25 which is connected to the magnetic head 22 so that the magnetic head 22 is maintained at an angle $\theta_2$.

As mentioned above, in the conventional magnetic head apparatus 21, the rear end of the magnetic head 22 is connected to the flexible print wiring board 25 so as to limit the downward movement of the magnetic head 22, the angle $\theta_2$ of the magnetic head 22 is determined by arrangement of the flexible print wiring board 25. Thus, the lowermost end of the magnetic head cannot be well defined. Accordingly, a distance (height) $H_2$ between the surface of the disc D and the rear end of the magnetic head 22 must include a tolerance, resulting in an obstacle to the reduction of the height (thickness) of the magnetic head apparatus 21.

Referring now to FIG. 1A, the conventional support arm 23 is formed to be an easily and elastically deformable structure by forming an opening 23b in a flat leaf spring member which substantially reduces the width of the leaf spring member. That is, the support arm 23 is elastically deformed at a portion provided with the opening 23b.

As mentioned above, in the head-up state, the operational lever 26 is moved upwardly to move the magnetic head 22 upwardly in the direction indicated by the arrow $B_1$. In this state, the support arm 23 is held only by the operational unit 24 and, thus, the support arm 23 is easily and elastically bendable in the directions indicated by arrows $B_1$ and $B_2$. Thus, the distance $H_2$ between the surface of the disc D and the magnetic head 22 is provided with a sufficient tolerance to absorb the swinging motion of the magnetic head 22 due to vibration when the disc D is inserted in the direction indicated by the arrow C.

Since the support arm 23 is formed from a leaf spring material, the support arm 23 is bendable in portions other than the portion provided with the opening 23b. Thus, the tolerance provided to the height $H_2$ is further increased to absorb the amount of deformation due to shocks and vibration. Thus, the space defined by the height $H_2$ is an obstacle to the reduction of the height of the magnetic head apparatus 21.

FIG. 3 is a perspective view of a connecting portion between the magnetic head 22 and the flexible print wiring board 25.

The connection between the magnetic head 22 and the flexible print wiring board 25 is performed by soldering connection pins 22b protruding from the coil bobbin 22a of the magnetic head 22 to the land portions 25a provided in the flexible print wiring board 25. First, ends of the coil wire wound on the coil bobbin 22a are engaged with the respective connection pins 22b. Thereafter, openings (not shown in the figure) formed in the land portions of the flexible print wiring board 25 are fit to the respective connection pins 22b. Then the land portions and connection pins 22b are soldered. Thus, the connection pins 22b protrude upwardly from the magnetic head 22.

FIG. 4 shows, similar to FIG. 2B, a head-up state where the magnetic head 22 is separated from the disc for loading and unloading the disc.

In the head-up state shown in FIG. 4, as mentioned above, the support arm 23 is limited by the limiting portion 24a provided to the operational unit 24. That is, when the magnetic head 22 is moved upwardly and the magnetic head 22 contacts the limiting portion 24a, further upward movement of the magnetic head 22 is limited by the limiting portion 24a. In this state, the connection pins protrude in a direction indicated by an arrow $B_1$, the connection pins protrude upwardly (in the direction indicated by the arrow $B_1$) beyond the limiting portion 24a. Accordingly, in order to prevent the pins 22 colliding with other component parts provided above the magnetic head apparatus 21, a predetermined distance $d_1$ must be provided between the limiting portion 24a and other component parts provided above the magnetic head apparatus 21.

That is, in the conventional magnetic head apparatus 21, since the connection pins 22b protruding from the magnetic head 22 protrude beyond the limiting portion 24a when the magnetic head 22 jumps up, a space is required to avoid a collision of the connection pins 22b with the limiting portion 22b. This space may be an obstacle to the reduction of the height of the magnetic head apparatus 21.

In the magnetic head apparatus 21, since the flexible print wiring board 25 is placed on the support arm 23, bending of the flexible print wiring board 25 must be taken into consideration.

FIG. 5A is an illustration of a portion of the structure of support arm 23 and the flexible print wiring board 25 in the head-up state; FIG. 5B is an illustration of the portion of the structure shown in FIG. 5A in the head-down state.

In the head-up state, the flexible print wiring board 25 is arranged on the surface of the support arm 23 without space therebetween. However, in the head-down state, the support arm 23 is bent in a direction indicated by an arrow $B_1$ as shown in FIG. 5B, and a length of the wiring path of the flexible print wiring board 25 is shortened. Thus, a bend is generated in the flexible print wiring board 25 in the upward direction (direction indicated by an arrow F in FIG. 5B). Thus, in the magnetic head apparatus 21, a space is provided above the support arm 23 so that the bend portion of the flexible print wiring board 25 does not contact other component parts provided above the magnetic head apparatus 21.

As mentioned above, in the conventional magnetic head apparatus 21, a space must be provided above the support arm 23 so as to avoid interference of the bent portion of the flexible print wiring board with other component parts. Thus, the space is an obstacle to the reduction of the height of the conventional magnetic head apparatus 21.

SUMMARY OF THE INVENTION

It is a general object of the present invention to provide an improved and useful magnetic head apparatus in which the above-mentioned problems are eliminated.

A more specific object of the present invention is to provide a magnetic head apparatus having a reduced thickness by preventing a jumping action of a magnetic head due to a swing movement in a head-up state.

It is another object of the present invention to provide a magnetic head apparatus having a reduced head by minimizing a distance between the magnetic head and a disc by precisely defining the position of the magnetic head in the head-up state.

It is another object of the present invention to provide a magnetic head apparatus having a reduced thickness by reducing an amount of elastic deformation of a support arm supporting the magnetic head due to shocks and vibration.

It is a further object of the present invention to provide a magnetic head apparatus having a reduced thickness by eliminating a portion protruding from an upper part of the magnetic head so as to eliminate a portion protruding beyond a member which limits upward movement of the magnetic head so that there is no collision with other component parts when the magnetic head jumps in the upward direction.

It is another object of the present invention to provide a method for reducing a magnetic head apparatus in which a portion protruding from the magnetic head in an upward direction is minimized.

It is a further object of the present invention to provide a magnetic head apparatus having a reduced thickness by eliminating a space provided for clearing an upwardly bent portion of a flexible print wiring board arranged on the support arm by preventing formation of the bent portion.

In order to achieve the above-mentioned objects, there is provided according to one aspect of the present invention a magnetic head apparatus having a magnetic head providing a magnetic field to a recording medium, comprising:

a support arm having a first end and a second end opposite to the first end, the support arm supporting the magnetic head at the first end, the support arm having a surface facing the recording medium;

a mount plate holding the support arm, the support arm being mounted to the mount plate at the second end; and a support portion extending from the mount plate, the support portion engaging the surface of the support arm at a position between the magnetic head and the mount plate.

According to the above-mentioned invention, the support arm is supported by the support portion of the mount plate in a state where the support arm is pressed against the support portion when the magnetic head is separated from the recording media. Thus, the support arm does not swing due to shocks and vibrations. Since the support portion is positioned on the side where the recording medium is located, the support portion is disengaged from the support arm when the magnetic head is pressed against the recording medium. In this arrangement, there is no need to provide a member for limiting upward movement of the leaf spring since the support arm is pressed against the support portion when the magnetic head is separated from the recording medium. Thus, a space above the magnetic head apparatus is minimized, resulting in reduction of thickness of an apparatus provided with the magnetic head apparatus.

Additionally, since the support arm is supported by the support portion when the magnetic head is separated from the recording medium, the distance between the magnetic head and the recording medium can be accurately set to a minimum distance.

In the magnetic head apparatus according to the present invention, the support portion may engage and support the support arm when the magnetic head is spaced from the recording medium, and the support portion may disengage from the support arm when the magnetic head is pressed against the recording medium.

Since the support portion is disengaged from the support arm when the magnetic head is pressed against the recording medium, the magnetic head is pressed against the recording medium only by the elastic force generated by the support arm so that the magnetic head can accurately follow the surface of the recording medium.

Additionally, the magnetic head apparatus according to the present invention may further comprise:

a wiring member electrically connecting the magnetic head to an external device; and a wire supporting portion provided in the support arm, the wire supporting portion supporting the wiring member so that the wiring member is bent and protrudes toward the recording medium.

Since the wiring member is bent as the bent portion protrudes toward the recording medium, the wiring member does not protrude above the support arm. Thus, a space for avoiding a collision of the bent portion of the wiring member with other component parts provided above the magnetic head apparatus can be eliminated. This results in a reduction of thickness of the apparatus provided with the magnetic head apparatus according to the present invention.

Additionally, the wire supporting portion may be formed in an elastically deformable portion of the support arm.

In one embodiment according to the present invention, the magnetic head may include a fixing portion mounted to the support arm and an engaging portion engaging the support arm, the engaging portion positioned in front of the fixing portion with respect to an insertion direction of the recording medium, a movement of the engaging portion toward the recording medium being limited by engagement of the engaging portion with the support arm.

The magnetic head may be rotatable about the fixing portion with respect to the recording medium, and an inclination angle of the magnetic head with respect to the recording medium is limited by engagement of the engaging portion with the leaf spring.

In this embodiment, since the downward movement of the engaging portion of the magnetic head is limited, the inclination angle of the magnetic head can be set to a predetermined angle. This allows an accurate setting of the distance between the magnetic head and the surface of the recording medium, resulting in reduction of thickness of the magnetic head apparatus.

Additionally, in one embodiment of the present invention, the leaf spring may comprise:

an elastically deformable magnetic head supporting portion, the magnetic head being mounted to the magnetic head supporting portion;

a suspension portion elastically deformable in response to an external force;

a connecting portion provided between the magnetic head supporting portion and the suspension portion; and a rib formed in the connecting portion so as to provide rigidity to the connecting portion.

Additionally, the magnetic head apparatus may further comprise a wiring member connecting the magnetic head to an external device, wherein the wiring member is attached on a surface of the leaf spring and the rib is arranged along a periphery of the wiring member. A height of the rib may be substantially equal to a thickness of the wiring member. Thus, a sufficient rigidity is provided by the rib to the leaf spring without increasing the thickness of the leaf spring.

Additionally, in one embodiment according to the present invention, the magnetic head apparatus may further comprise a flexible print wiring board electrically connecting the magnetic head to an external device, the flexible print wiring board including a land portion, wherein the flexible print wiring board is electrically connected to the magnetic head by soldering a wire of a coil of the magnetic head to the land portion.

In this invention, there is no need to provide parts for connecting the flexible print wiring board to the magnetic head. Thus, the magnetic head does not have parts which protrude from the upper surface, resulting in reduction of thickness of the apparatus provided with the magnetic head apparatus according to the present invention. Additionally, since the flexible print wiring board does not engage a connecting part such as a pin, precise control of the positioning is not required.

Additionally, there is provided according to another aspect of the present invention a method for manufacturing a magnetic head apparatus having a magnetic head providing a magnetic field to a recording medium, the magnetic head apparatus further comprising a flexible print wiring board electrically connecting the magnetic head to an external device, the flexible print wiring board including a land portion, and the flexible print wiring board is electrically connected to the magnetic head by soldering a wire of a coil of the magnetic head to the land portion, the method comprising the steps of:

placing the flexible print wiring board on the magnetic head;

placing the wire of the coil on the land portion;

soldering the wire to the land portion; and removing an unnecessary portion of the wire extending from a soldered portion.

Other objects, features and advantages of the present invention will become more apparent from the following detailed description when read in conjunction with the accompanying drawings.

BRIEF DESCRIPTION OF THE DRAWINGS

FIG. 2A is a side view of the magnetic head apparatus shown in FIG. 1A in a head-down state where a magnetic head is moved downwardly; FIG. 2B is a side view of the magnetic head apparatus shown in FIG. 1A in a head-up state where the magnetic head is moved upwardly;

FIG. 6A is a plan view of a magnetic head apparatus according to an embodiment of the present invention; FIG. 6B is a side view of the magnetic head apparatus shown in FIG. 6A;

FIG. 8A is a plan view of a support arm shown in FIG. 6A; FIG. 8B is a side view of the support arm shown in FIG. 8A;

FIG. 11A is a side view of the magnetic head apparatus in a head-up state where a disc is being loaded to or unloaded from the magnetic disc apparatus; FIG. 11B is a side view of the magnetic head apparatus in a head-down state where the magnetic head contacts a protective film of the disc;

DETAILED DESCRIPTION OF THE PREFERRED EMBODIMENT

Figure 1A:
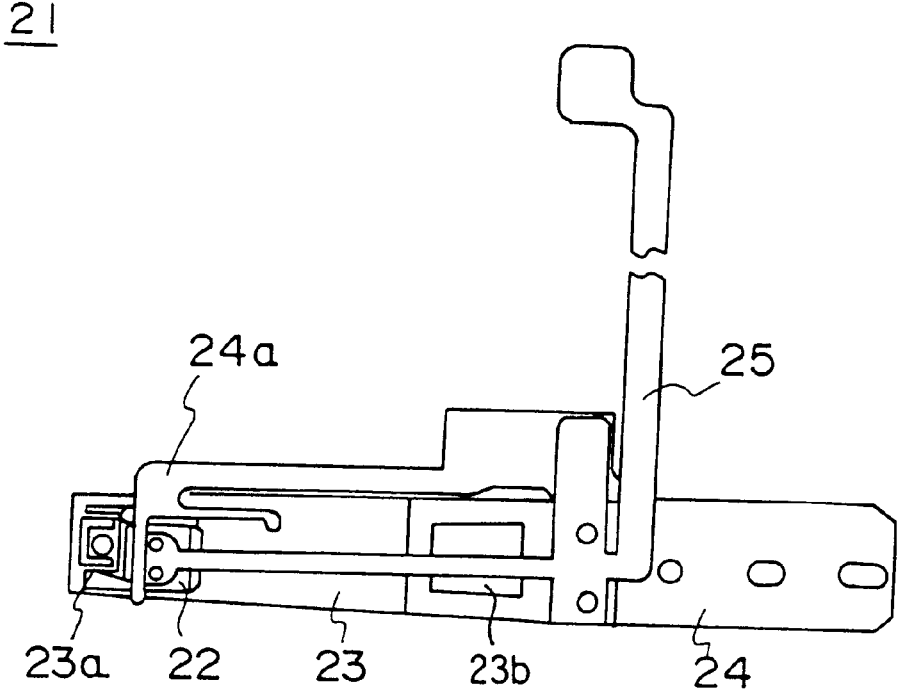
FIG. 1A is a plan view of a conventional magnetic head apparatus.
Figure 1B:
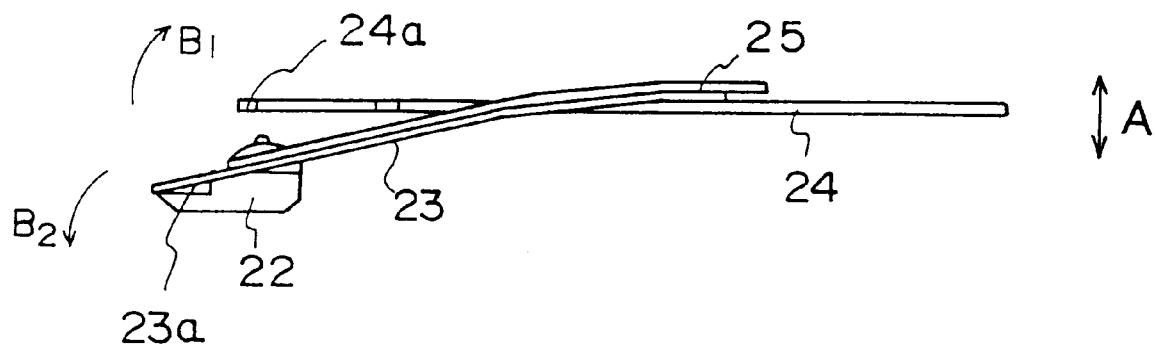
FIG. 1B is a side view of the magnetic head apparatus shown in FIG. 1A.

A description will now be given of a magnetic head apparatus according to an embodiment of the present invention. FIG. 6A is a plan view of the magnetic head apparatus 1 according to the embodiment of the present invention; FIG. 6B is a side view of the magnetic head apparatus 1 shown in FIG. 6A.

The magnetic head apparatus 1 according to the present embodiment is used for a magneto-optical disc apparatus. The magnetic head apparatus 1 is positioned on the opposite side of an optical pickup with respect to a magneto-optical disc so as to provide a vertical magnetic field, which responds to a recording signal, to the magneto-optical disc. The magnetic head apparatus 1 comprises a magnetic head 2 providing the vertical magnetic field to the magneto-optical disc, a support arm 3 which supports the magnetic head 2, a mount plate 4 which supports the support arm 3 and a flexible print wiring board 5 which electrically connects the magnetic head 2 to an external circuit.

The magnetic head 2 is supported by the support arm 3 which is made of a leaf spring material. The magnetic head 2 is pressed against the disc in a state where the support arm 3 is elastically deformed so that the magnetic head 2 provides a magnetic field to the disc. The support arm 3 is mounted to the mount plate 4. The mount plate 4 is rotated by an operational lever so as to be in one of a head-down state and a head-up state. In the head down states, the magnetic head 2 contacts a protective film of the disc. In the head-up state, the magnetic head 2 is separated from the disc. In the head-up state, since a middle portion of the support arm 3 is supported by a portion of the mount plate 4 so that the support arm 3 is elastically deformed, the support arm 3 will not be further deformed due to shocks and vibrations.

In the head-down state, the support arm 3 is separated from the portion of the mount plate 4, and the magnetic head 2 is pressed against the disc due to the elastic force of the support arm 3. The flexible print wiring board 5 is connected to the magnetic head at one end thereof, and extends along the support arm 3 to the mount plate 4. The opposite end of the flexible print wiring board 5 leads to an external circuit so as to connect the magnetic head 2 to the external circuit.

Figure 7C:
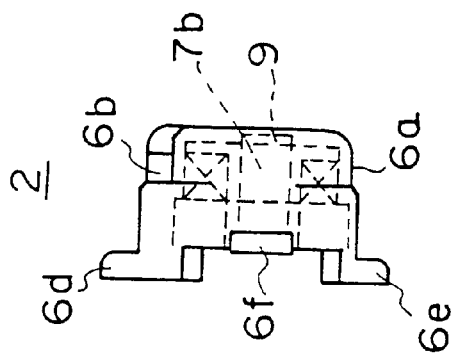
FIG. 7C is a side view of the magnetic head shown in FIG. 7A.
Figure 7A:
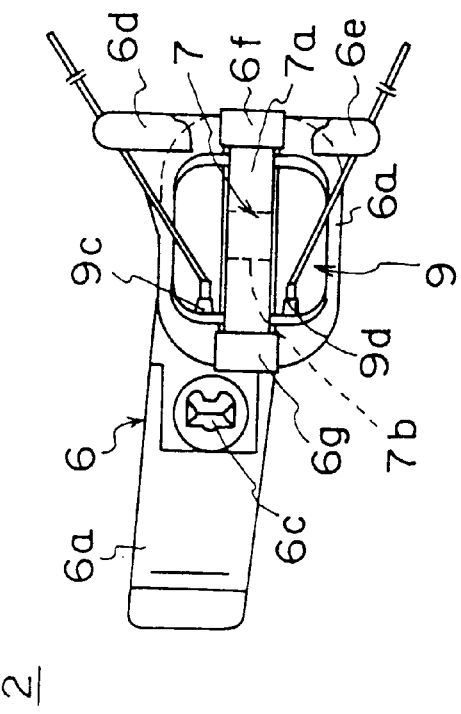
FIG. 7A is a plan view of a magnetic head shown in FIG. 6A.
Figure 7B:
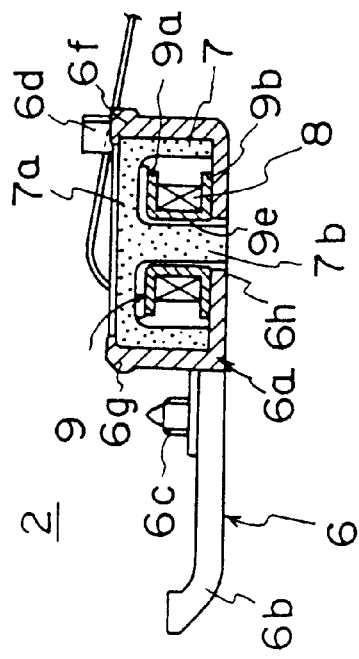
FIG. 7B is a cross-sectional view of the magnetic head shown in FIG. 7A.

FIG. 7A is a plan view of the magnetic head 2; FIG. 7B is a cross-sectional view of the magnetic head 2; FIG. 7C is a side view of the magnetic head 2.

The magnetic head 2 comprises a slider 6 sliding on the disc, a core 7 in which a magnetic field is generated, a coil 8 generating the magnetic field which corresponds to a recording signal supplied via the flexible print wiring board and a coil bobbin 9 on which a coil 8 is wound.

The slider 6 comprises mounting portion 6a, a sliding portion 6b, a protruding portion 6c which engages protrusions 6d and 6e and an engaging portion 6f. These portions are integrally formed by a plastic material. The slider mounting portion 6a receives the coil bobbin 9 and the core 7. The sliding portion 6b slides on the disc in a stable condition. The protruding portion 6c is formed on an upper surface of the sliding portion 6b so that the support arm 3 is mounted thereto. The engaging protrusions 6d and 6e engages with the support arm 3 in the head-up state. The slider engaging portion 6f holds the core 7. A through opening 6h is formed in the bottom of the slider mounting portion 6a so that a portion of core 7 is inserted into the through opening 6h.

The core 7 is formed of an E-shaped magnetic material such sintered ferrite. The core 7 includes magnetic pole 7b which protrudes from a beam portion 7a. The magnetic pole 7b protrudes inside the coil bobbin 9, and is fitted into the through opening 6h. The magnetic pole 7b provides a magnetic field to the disc.

The coil bobbin 9 is a cylindrical member having collars 9a and 9b on the opposite ends, respectively. The coil 8 is formed by a conductive wire which is wound on the coil bobbin 9 between the collars 9a and 9b. Guide slits 9c and 9d are formed on the upper collar 9a so as to guide opposite ends of the coil 8, respectively. That is, the ends of the coil 8 are inserted into the respective guide slits 9c and 9d, and are bent at corners of the guide slits 9c and 9d so that the ends of the coil 8 are held by the coil bobbin 9.

Additionally, the magnetic pole 7b of the core 7 is inserted into an opening 9e formed in the center of the coil bobbin 9. Thus, the coil 8 is provided around the magnetic pole 7b so that a magnetic field generated by the coil 8 is provided to the disc through the magnetic pole 7b.

The coil 8 is connected to the flexible print wiring board 5. The connection is made by soldering the ends of the coil 8, which are guided by the guide slits 9c and 9d, to land portions 5c and 5d of the flexible print wiring board 5. Thus, the coil 9 does not have a portion protruding from the slider 6.

The magnetic head 2 is supported by the protruding portion 6c of the slider 6 being engaged with the support arm 3.

Figure 3:
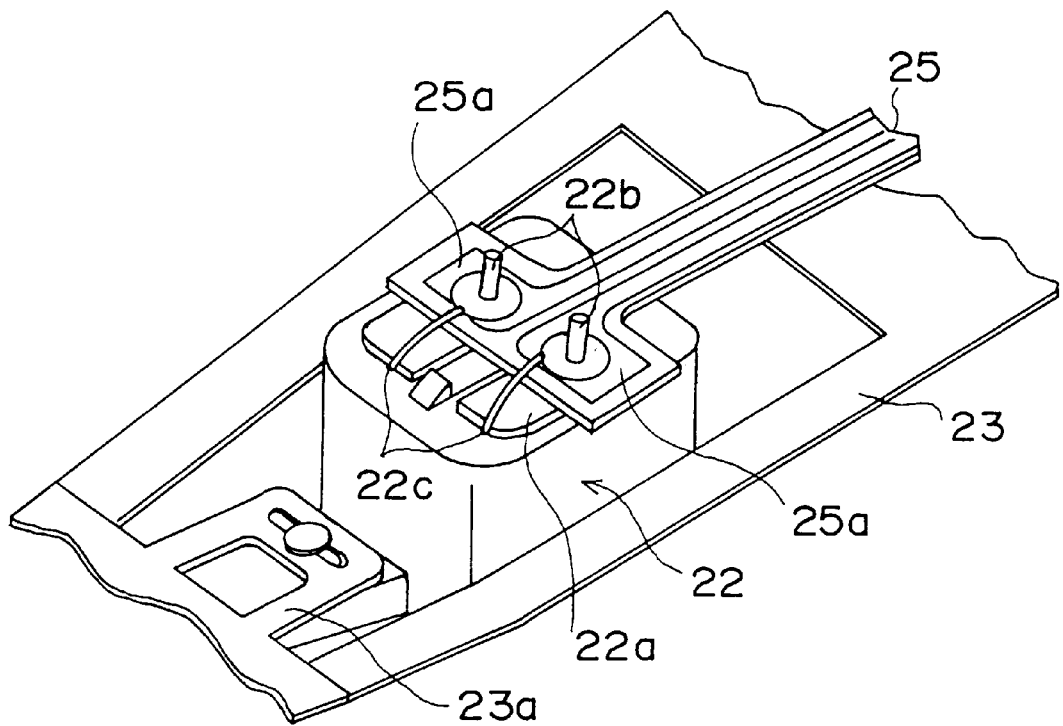
FIG. 3 is a perspective view of a portion of the magnetic head apparatus in which the magnetic head is mounted to the support arm.
Figure 4:
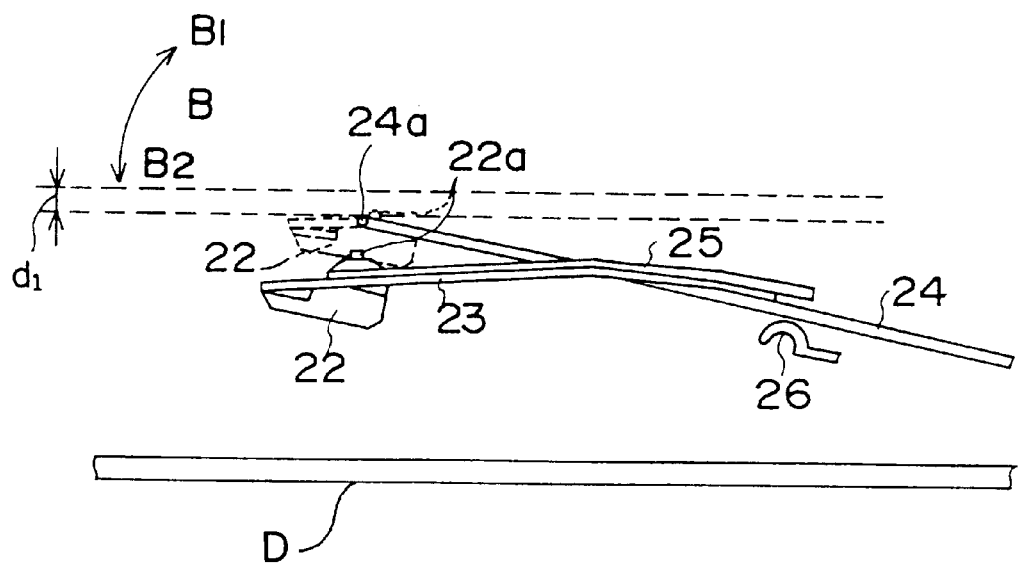
FIG. 4 is a side view of the magnetic head apparatus shown in FIG. 1A in a state where the magnetic head is moved upwardly.
Figure 5A:
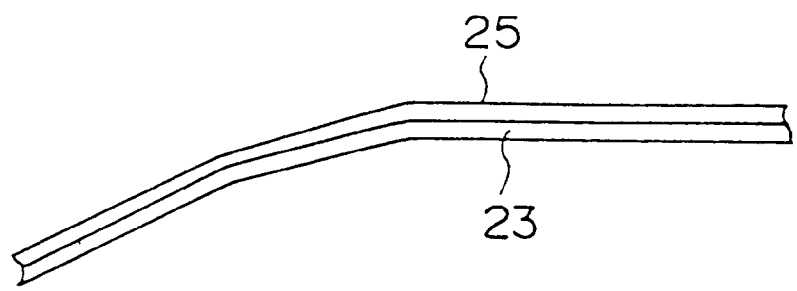
FIG. 5A is a side view of a portion of a structure formed by a combination of the support arm and a flexible print wiring board in the head-up state.
Figure 5B:
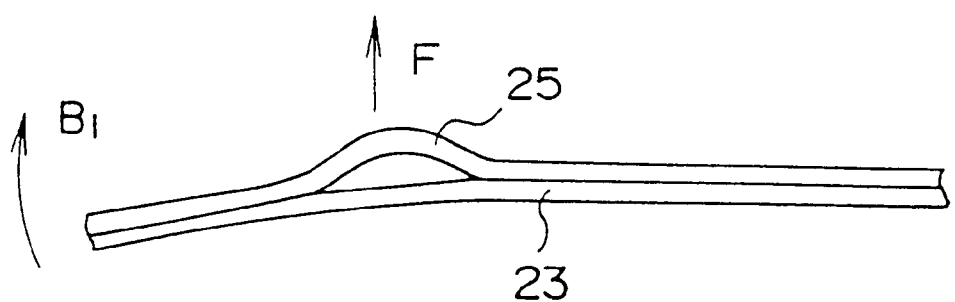
FIG. 5B is a side view of the portion of the structure shown in FIG. 5A in the head-down state.

FIG. 8A is a plan view of the support arm 3; FIG. 3B is a side view of the support arm 3.

The support arm 3 comprises a magnetic head supporting portion 3a, a connecting portion 3b, a suspension portion 3c and a mounting portion 3d. These portions are integrally formed by a leaf spring material in that order. The magnetic head supporting portion 3a supports the magnetic head 2. The connecting portion 3b extends from the magnetic head supporting portion 3a. The suspension portion 3c extends from the connecting portion 3b so as to elastically support the magnetic head 2. The mounting portion 3d is mounted to the mount plate 4.

The magnetic head supporting portion 3a includes an opening 3e in which the magnetic head 2 is provided and an engaging portion 3f to which the magnetic head 2 is mounted. Since the support arm opening 3e is formed in the magnetic head supporting portion 3a, the magnetic head supporting portion 3a can be easily bent in directions indicated by arrows C1 and C2 in FIG. 8B as compared to the connecting portion 3b. Thus, in the head-down state, the magnetic head supporting portion 3a is elastically deformed so that the magnetic head 2 follows a surface configuration of the disc. That is, the magnetic head 2 can be moved in the directions C1 and C2 by the elastic deformation of the magnetic head supporting portion 3a so that the magnetic head 2 is always contacted to the surface of the disc.

The support arm engaging portion 3f is provided with an engaging opening 3g. The protruding portion 6c of the slider 6 is inserted into the engaging opening 3g so that the magnetic head 2 is supported by the support arm 3.

When the magnetic head 2 is mounted to the magnetic head supporting portion 3a, the protruding portion 6c is inserted into the engaging opening 3g from under side while the protrusions 6d and 6e are positioned on the upper side of a peripheral portion 3h of the support arm opening 3e. Thereafter, an upper portion of the protruding portion 6c is deformed while heating so as to secure the magnetic head 2 to the support arm.

The engaging portion 3f is connected to the peripheral portion 3h via a connecting member 3i. Since the connecting member 3i is provided with an opening, the width of the connecting member 3i is reduced. Thus, the engaging portion 3f can be bent in directions indicated by arrows D in FIG. 8B so that the magnetic head 2 follows the surface configuration of the disc and is always in contact with the surface of the disc.

In the magnetic head supporting portion 3a, the peripheral portion 3h is bent by about 17.5° in the direction indicated by the arrow C1 at a position indicated by S1 with respect to the extending direction of the magnetic head supporting portion 3a. Thus, an angle of the magnetic head 2 with respect to the disc is reduced. Additionally, the magnetic head supporting portion 3a is inclined with respect to connecting portion 3b about 17.5° in the direction C2.

The connecting portion 3b is inclined with respect to the suspension portion 3c by about 13.5° in the direction C2. The connecting portion 3b is positioned between the magnetic head supporting portion 3a and the suspension portion 3c. The connecting portion 3b is provided with ribs 3j which provide rigidity to the connecting portion 3b. The ribs 3j protrude upwardly, and a wiring path for the flexible print wiring board 5 is formed between the ribs 3j. Thus, the ribs 3j do not protrude beyond the flexible print wiring board 5. The ribs 3j provide rigidity to the connecting portion 3b between the magnetic head supporting portion 3a and the suspension portion 3c. That is, the connecting portion 3b is not bent due to shocks and vibrations. This eliminates a space reserved for absorbing the bending motion of the support arm 3, resulting in reduction of the thickness of the magnetic head apparatus 1.

The suspension portion 3c extends from the connecting portion 3b and is bent at an angle of about 13.5° with respect to the support arm mounting portion 3d. The suspension portion 3c has an opening 3k in the center so that a width of the suspension portion 3c is reduced.

Accordingly, the suspension portion 3c is bent in response to movement of the connecting portion 3b in the directions indicated by the arrows C1 and C2 so as to absorb vibration. Additionally, a tab 31 is formed in the suspension portion opening 3k to engage with the flexible print wiring board 5. The flexible print wiring board 5 runs along the surface of the connecting portion 3c from which the ribs 3b are protruded, and extends to the suspension portion 3j. The flexible print wiring board 5 enters the suspension portion opening 3k, and is lead to the back side of the tab 31. The flexible print wiring board 5 is then lead to the front side of the connecting portion 3c. Thus, when the suspension portion 3c is bent in the direction indicated by arrow C2, the flexible print wiring board 5 does not protrude in the direction indicated by the arrow C2 in FIG. 8B since the movement of the flexible print wiring board 5 in the C2 direction is prevented by the protruding portion 31.

The mounting portion 3d extends from the suspension portion 3c, and is mounted to the mount plate 4 by means of welding so that the support arm 3 and the mount plate 4 are integral. The mounting portion 3d is provided with apertures 3m for mounting the magnetic head apparatus 1 to a magnetic head mounting portion (not shown in the figures) of the disc apparatus. That is, the magnetic head apparatus 1 is secured to the magnetic head mounting portion by screws inserted through the apertures 3m and screwed into the magnetic head mounting portion.

Figure 9A:
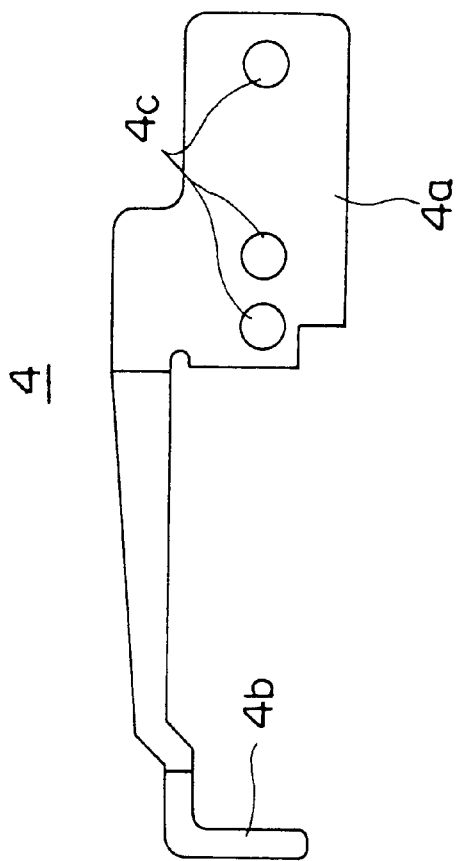
FIG. 9A is a plan view of the mount plate shown in FIG. 6A.
Figure 9B:
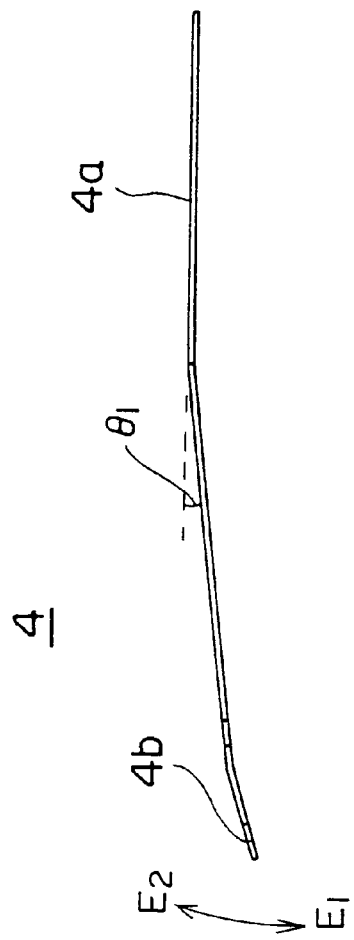
FIG. 9B is a side view of the mount plate shown in FIG. 9A.
Figure 9C:
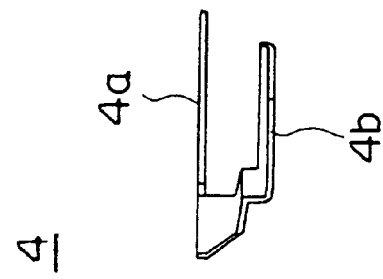
FIG. 9C is a front view of the mount plate shown in FIG. 9A.

FIG. 9A is a plan view of the mount plate 4; FIG. 9B is a side view of the mount plate 4; FIG. 9C is a front view of the mount plate 4.

The mount plate 4 supports the support arm 3. The mount plate 4 comprises a fixing portion 4a which is mounted to the magnetic head mounting portion and a support portion 4b which supports the support arm 3 in a state where the support arm 3 is urged in a direction indicated by an arrow E2 in FIG. 9B. The fixing portion 4a is provided with apertures 4c corresponding to the apertures 3m formed in the mounting portion 3d of the support arm 3. Thus, the support arm 3 and the mount plate 4 together are fixed to the magnetic head mounting portion by screws (not shown in the figures).

The support portion 4b has a generally L-shape. The support portion 4b extends from the fixing portion 4a, and is bent at an angle θ, which is smaller than 17 degrees, with respect to the fixing portion 4a in the direction indicated by an arrow E1 in FIG. 9B. An end of the support portion 4b is slightly bent further in the direction indicated by the arrow E1.

When the support arm 3 is assembled to the mount plate 4, the upper surface of the mounting portion 3d of the support arm 3 is positioned under the fixing portion 4a of the mount plate 4. Then the, suspension portion 3c of the support arm 3 is elastically bent in a direction indicated by an arrow E2 in FIG. 9B so that the back surface of the connecting portion 3b of the support arm 3 is placed on the upper surface of the support portion 4b of the mount plate 4. In this state, the support arm mounting portion 3d of the support arm 3 and the fixing portion 4a of the mount plate 4 are secured to each other by welding.

The flexible print wiring board 5 is provided for supplying signals corresponding to recording information to the magnetic head 2. A magnetic head connecting portion 5a (shown in FIG. 6A) to be connected to the magnetic head 2 is formed on an end of the flexible print wiring board 5. A circuit connecting portion 5b is formed on the opposite end of the flexible print wiring board 5. The connection of the magnetic head connecting portion 5a to the magnetic head 2 is achieved by soldering the ends of the coil 8 to the magnetic head connecting portion 5a.

Figure 10A:
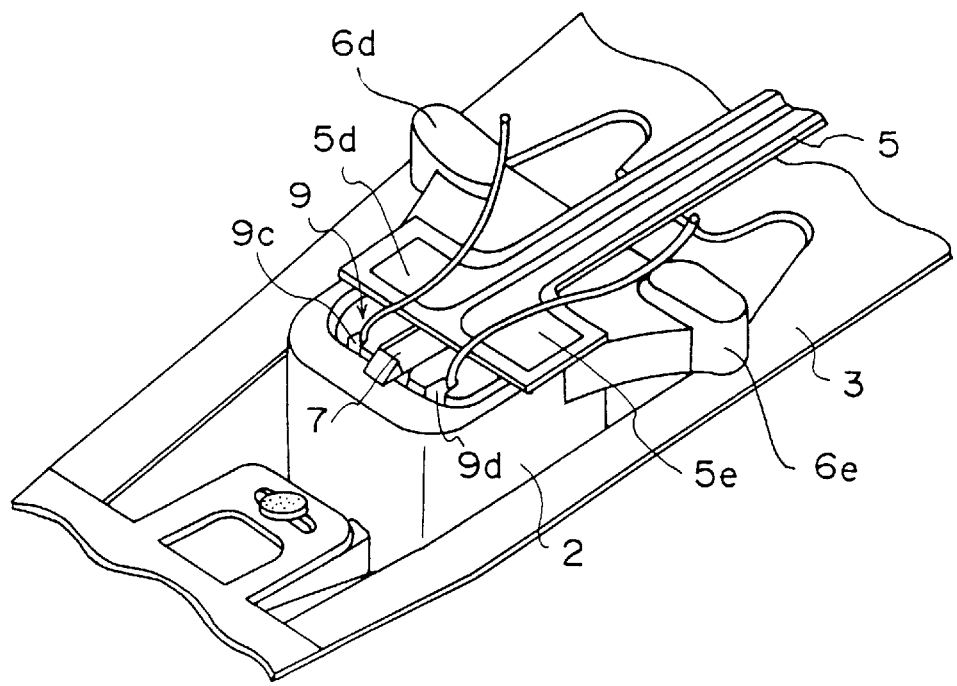
FIG. 10A is a perspective view of a state of a connecting portion before soldering in which connecting state the magnetic head and a flexible print wiring board are connected to each other.
Figure 10B:
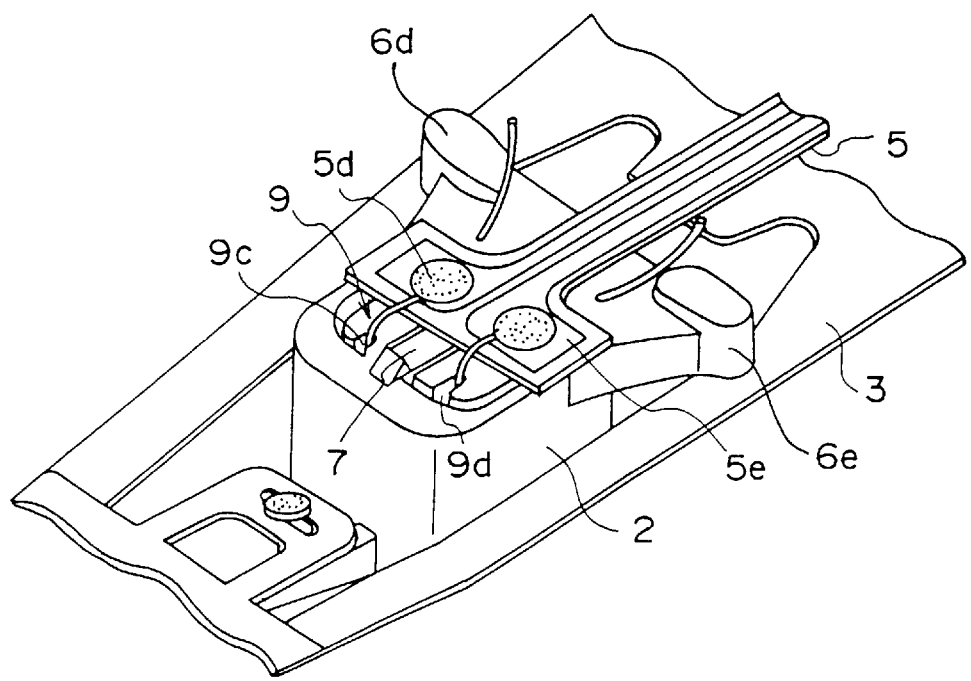
FIG. 10B is a perspective view of a state of the connecting portion shown in FIG. 10A before soldering.

FIG. 10A is a perspective view of a connecting portion of the magnetic head 2 and the magnetic head connecting portion 5a before they are soldered; FIG. 10B is a perspective view of a connecting portion of the magnetic head 2 and the magnetic head connecting portion 5a after they are soldered.

The connection of the flexible print wiring board 5 to the magnetic head 2 is achieved by performing the following steps. First, the magnetic head connecting portion 5a of the flexible print wiring board 5 is placed on the upper surface of the magnetic head 2 as shown in FIG. 10A (first step). Then, the ends of the coil 8, which extend from the respective guide slits 9c and 9d, are lead to pass above respective land portions 5d and 5e formed on the magnetic head connecting portion 5a (second step). Thereafter, the ends of the coil 8 are soldered to the land portions 5d and 5e (third step). Then, unnecessary portions of the ends of the coil 8 are cut off or otherwise removed (fourth step).

According to the connecting method mentioned above, the magnetic head 2 and the flexible print wiring board 5 are connected to each other by the wire of the coil 8. Thus, if the magnetic head connecting portion 5a is offset from the magnetic head 2, the ends of the coil 8 can be easily lead to the positions above the land portions 5d and 5e of the flexible print wiring board 5. Thus, extreme accuracy is not required for positioning the flexible print wiring board 5, and high-productivity is achieved.

In the magnetic head 2, the coil bobbin 9 is fit in the slider with some degree of play. According to the above-mentioned connecting method, the coil bobbin 9 is not moved due to a force exerted by the flexible print wiring board 5 when the flexible print wiring board 5 is offset.

Additionally, only the soldered portions protrude from the upper surface of the magnetic head 2. Thus, amount of protrusion is minimized.

The flexible print wiring board 5 connected to the magnetic head 2 passes through the center of the magnetic head supporting portion 3a, and is lead to the connecting portion 3b. The flexible print wiring board 5 passes between the ribs 3j, and is slightly deflected to the outside in the middle of the connecting portion 3b, and then lead to the suspension portion 3c.

In the suspension portion 3c, the flexible print wiring board 5 runs along a side edge of the opening 3k. Then, the flexible print wiring board 5 is lead to the back side of the tab 31. Thus, upward movement of the flexible print wiring board 5 is limited by the tab 31, and the flexible print wiring board 5 does not protrude from the upper surface of the suspension portion 3c. Accordingly, there is no need to provide a space for the protrusion of the flexible print wiring board 5, resulting in a reduction of the thickness of the disc apparatus.

The flexible print wiring board 5 runs through the suspension portion 3c, and then runs through the fixing portion 4a of the mount plate 4. The flexible print wiring board 5 is attached to the mount plate 4 by an adhesive tape. The end of the flexible print wiring board 5 extending from the mount plate 4 is bent in a predetermined shape, and is provided with the circuit connecting portion 5b.

FIG. 11A is a side view of the magnetic head apparatus 1 in a state where the disc is being loaded or unloaded; FIG. 11B is a side view of the magnetic head apparatus 1 in a state where the magnetic head contacts the protective film of the disc.

In FIGS. 11A an 11B, an operational lever 10 controls the up and down movement of the magnetic head. The mount plate 4 is mounted to the magnetic head mounting portion 11 of the disc apparatus.

In the head-up state shown in FIG. 11A, the mount plate is moved upwardly so that the magnetic head 2 is separated from the protective film of the disc D. In this state, the support arm 3 is engaged with and supported by the support portion 4b of the mount plate 4 while the support arm 3 is elastically bent in a direction indicated by an arrow B1 in FIG. 11A.

That is, the support arm 3 is pressed against the support portion 4b of the mount plate 4 due to the elastic deformation of the suspension portion 3c. In this state, if shocks or vibrations are applied to the support arm 3, the support arm 3 does not easily jumps in the direction B1 since the support arm 3 is pressed against the support portion 4b.

Additionally, the support arm 3 is supported by the support portion 4b from the under side of the support arm 3, the support arm 3 does not move downwardly due to the elasticity of the support arm 3. Accordingly, a distance between the magnetic head 2 and the disc D can be accurately set. Thus, the distance between the magnetic head 2 and the disc D can be minimized, resulting in a reduction of the thickness of the disc apparatus provided with the magnetic head apparatus 1.

In the head-down state shown in FIG. 11, the operational lever 10 is moved downwardly in a direction indicated by an arrow A2, and the mount plate 4 is moved downwardly due to a returning force exerted thereon. Thus, the magnetic head 2 is moved downwardly and contacts the disc D. In this state, the support of the support arm 3 is changed from the support by the support portion 4b of the mount plate 4 to the support of the magnetic head 2 contacting the disc D. Thus, the magnetic head 2 is pressed against the disc D by a pressing force generated by the elastic deformation of the support arm 3, resulting in the head-down state. In this state, the protrusions 6d and 6e are separated from the support arm 3 since the support arm is elastically deformed due to the pressing force exerted by the mount plate 4.

As mentioned above, in the present embodiment, since swing motion of the magnetic head 2 can be limited by the elastic deformation of the support arm 3 in the head-up state, there is no need to provide a member which restricts the upward movement of the support arm 3. Thus, the space above the magnetic head 2 can be minimized in the head-up state, resulting in the reduction of the thickness of the apparatus provided with the magnetic head apparatus 1.

A magnetic head mounting member 11 is rotatable in the optical disc apparatus in the directions indicated by arrows B1 and B2 in FIGS. 11A and 11B. The magnetic head mounting member 11 is urged by a spring in the direction indicated by the arrow B2.

In the head-up state shown in FIG. 11A, the mount plate 4 is moved upwardly in the B1 direction by the operational lever 10. Thus the magnetic head 2 is rotated and inclined due to its own weight in a direction indicated by an arrow A1 about a position where the slider 6 is mounted to the support arm 3. In this state, the protrusions 6d and 6e are engaged with the peripheral portion 3h of the magnetic head supporting portion 3a of the support arm 3, and the inclination of the magnetic head 2 is limited to a predetermined angle θ1. Accordingly, the inclination of the magnetic head 2 can be accurately set in the head-up state. Thus, the distance h1 between the magnetic head 2 and the disc D is set a minimum, resulting in a height reduction of the disc apparatus provided with the magnetic head apparatus 1.

Figure 12:
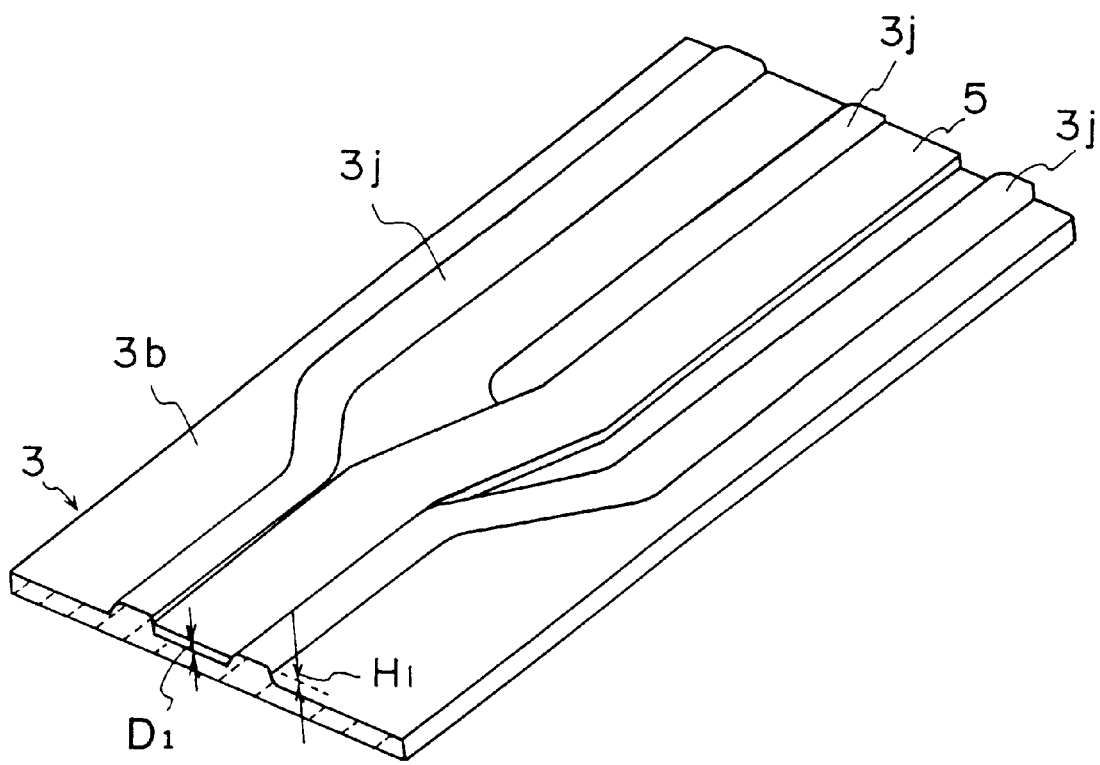
FIG. 12 is a perspective view of a portion of a structure formed by a combination of the support arm and the flexible print wiring board attached to the support arm.

FIG. 12 is a perspective view of a portion of the flexible print wiring board 5 attached on the support arm 3.

The flexible print wiring board 5 is located between the ribs 3j in the connecting portion 3b, and is slightly bent toward the outside and is lead to the suspension portion 3c. The height H1 of the ribs and the thickness D1 of the flexible print wiring board 5 is substantially equal to each other. Thus, the ribs does not protrude from the surface of the flexible print wiring board 5. The ribs provide rigidity to the connecting portion 3b without increasing the thickness of the connecting portion 3b.

According to the present embodiment, the support arm 3 includes a rigid portion which includes the connecting portion 3b and an elastically deformable portion which includes the magnetic head supporting portion 3a and the suspension portion 3c. Thus, the deformation of the support arm 3 can be accurately controlled so as to accurately determine the position of the magnetic head 2. Thus, the distance between the magnetic head 2 and the disc D can be minimized, resulting in the reduction of thickness of the disc apparatus provided with the magnetic head apparatus 1.

Figure 13A:
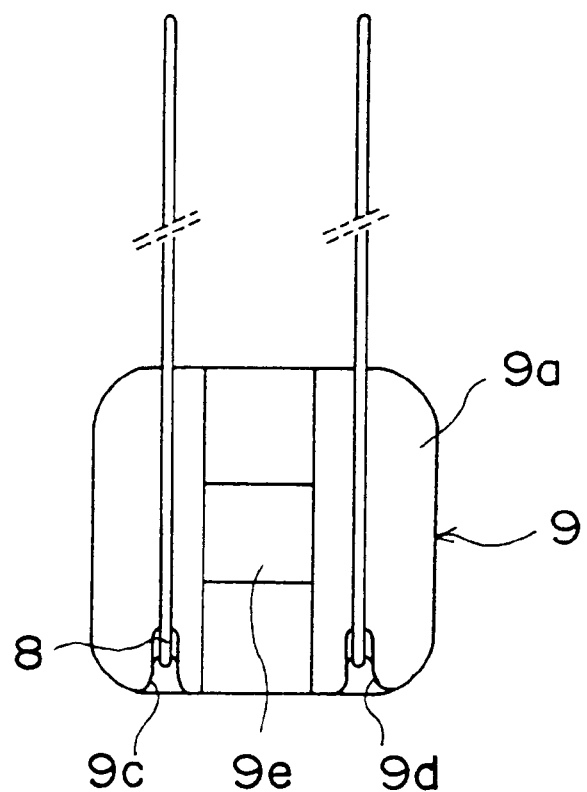
FIG. 13A is a plan view of a coil bobbin shown in FIG. 7A.
Figure 13B:
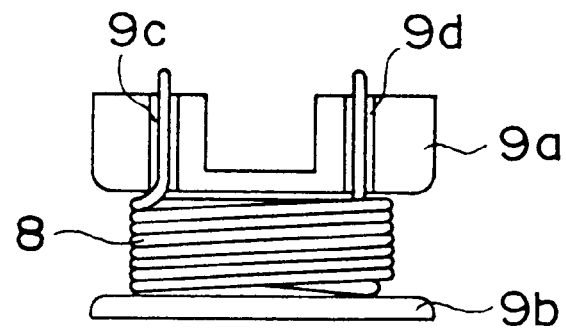
FIG. 13B is a front view of the coil bobbin shown in FIG. 13A.

FIG. 13A is a plan view of the coil bobbin 9; FIG. 13B is a front view of the coil bobbin 9.

As mentioned above, the coil bobbin 9 is a cylindrical member having the collars 9a and 9b on the opposite ends, respectively. The coil 8 is formed by a conductive wire which is wound on the coil bobbin 9 between the collars 9a and 9b. The guide slits 9c and 9d are formed on the upper collar 9a so as to guide opposite ends of the coil 8, respectively. That is, the ends of the coil 8 are inserted into the respective guide slits 9c and 9d, and are bent at corners of the guide slits 9c and 9d so that the ends of the coil 8 are held by the coil bobbin 9. Accordingly, the coil 8 is held in a position until a soldering operation is completed by bending the ends of the wire forming the coil 8 at the corners of the guide slits 9c and 9d. Thus, the handling of the coil 8 is easy.

Additionally, using the connecting method according to the present invention, since there is no need to provide pins above the magnetic head 2, members provided above the magnetic head 2 can be positioned very close to the magnetic head 2, resulting in the reduction of thickness of the disc apparatus provided with the magnetic head apparatus 1. That is, there is no need to provide a space above the magnetic head 2, the height of the magnetic head apparatus 1 can be minimized, resulting in the reduction of thickness of the disc apparatus provided with the magnetic head apparatus 1.

Additionally, according to the present embodiment, a portion of the flexible print wiring board 5 on the suspension portion 3c, which is a bendable portion of the support arm 3, is bent downwardly and the upward movement in the direction A of FIG. 11B is limited by the tab 31. Thus, if the suspension portion 3c is bent in the direction B1 of FIG. 11B, the flexible print wiring board 5 is not bent in the direction A of FIG. 11A.

Figure 14:
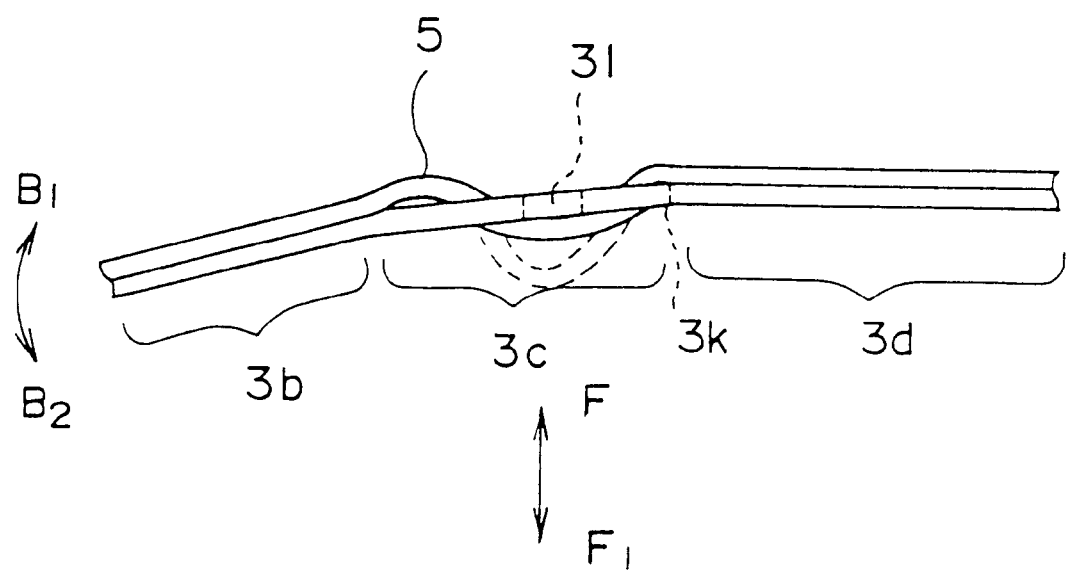
FIG. 14 is a side view of a portion of the flexible print wiring board.

FIG. 14 shows a part of the flexible print wiring board 5 in the vicinity of the tab 31. The flexible print wiring board 5 runs along the front surface of the connecting portion 3b, and then is lead through the suspension portion opening 3k to the back side of the tab 31. The flexible print wiring board 5 is then lead to the front surface of the mounting portion 3d through the suspension portion opening 3k. Thus, the flexible print wiring board 5 is bent into substantially a U-shape opening upwardly. That is, since the flexible print wiring board 5 is previously bent as it protrudes downwardly in the suspension portion 3c, the flexible print wiring board 5 is bent and protrudes in the direction indicated by an arrow F1 when the suspension portion 3c is bent in a direction indicated by an arrow B1 of FIG. 14. Thus, the flexible print wiring board 5 does not protrude upwardly in a direction indicated by an arrow F of FIG. 14. Accordingly, there is no need to provide a space for the protrusion of the flexible print wiring board 5 above the magnetic head apparatus 1. Thus, other component parts of the disc apparatus can be positioned close to the magnetic head apparatus 1, resulting in a reduction of thickness of the disc apparatus provided with the magnetic head apparatus 1.

The present invention is not limited to the specifically disclosed embodiments, and variations and modifications may be made without departing from the scope of the present invention.

What is claimed is:

1. A magnetic head apparatus having a magnetic head providing a magnetic field to a recording medium, comprising:

a support arm having a first end and a second end opposite to said first end, said support arm supporting said magnetic head at said first end, said support arm having a surface facing said recording medium;

a mount plate holding said support arm, said support arm being mounted to said mount plate at said second end; and a support portion extending from said mount plate, said support portion being adapted for engaging said surface of said support arm at a location on said support arm intermediate said first and second ends.

2. The magnetic head apparatus as claimed in claim 1, wherein said support portion has means for engaging and supporting said support arm when said magnetic head is spaced from said recording medium, and means for disengaging from said support arm when said magnetic head is pressed against said recording medium.

3. The magnetic head apparatus as claimed in claim 1, further comprising:

a wiring member electrically connecting said magnetic head to an external device; and a wire supporting portion provided in said support arm, said wire supporting portion supporting said wiring member so that said wiring member is bent and protrudes toward said recording medium.

4. The magnetic head apparatus as claimed in claim 3, wherein said wire supporting portion comprises a tab formed in an elastically deformable portion of said support arm.

5. The magnetic head apparatus as claimed in claim 1, wherein said magnetic head includes a sliding portion mounted to said support arm and at least one protrusion adapted for engaging said support arm, said at least one protrusion positioned behind said sliding portion with respect to an insertion direction of said recording medium, a movement of said at least one protrusion toward said recording medium being limited by engagement of said at least one protrusion with said support arm.

6. The magnetic head apparatus as claimed in claim 5, wherein said magnetic head is rotatable with respect to said recording medium, and an inclination angle of said magnetic head with respect to said recording medium is limited by engagement of said at least one protrusion with said support arm.

7. The magnetic head apparatus as claimed in claim 1, wherein said support arm comprises:

an elastically deformable magnetic head supporting portion, said magnetic head being mounted to said magnetic head supporting portion;

a suspension portion elastically deformable in response to an external force;

a connecting portion provided between said magnetic head supporting portion and said suspension portion; and a rib formed in said connecting portion so as to provide rigidity to said connecting portion.

8. The magnetic head apparatus as claimed in claim 7, further comprising a wiring member connecting said magnetic head to an external device, wherein said wiring member is attached on a surface of said support arm and said rib is arranged along a periphery of said wiring member.

9. The magnetic head apparatus as claimed in claim 8, wherein a height of said rib is substantially equal to a thickness of said wiring member.

10. The magnetic head apparatus as claimed in claim 1, wherein said wiring member comprises a flexible print wiring board electrically connecting said magnetic head to an external device, said magnetic head having at least one coil of wire, said flexible print wiring board including a land portion, wherein said flexible print wiring board is electrically connected to said magnetic head by soldering a wire of said at least one coil to said land portion.

* * * * *